June 3, 1952   J. M. FOLKER   2,599,099
FISHING ROD HOLDER
Filed Aug. 24, 1948

John M. Folker
INVENTOR.

BY *Clarence A. O'Brien*
*and Harvey B. Jacobson*
Attorneys

Patented June 3, 1952

2,599,099

UNITED STATES PATENT OFFICE 2,599,099

FISHING ROD HOLDER

John M. Folker, Cleveland, Ohio, assignor of forty-five per cent to Dewey S. Folker, Cleveland, Ohio Application August 24, 1948, Serial No. 45,941

7 Claims. (Cl. 242—84.1)

This invention relates to new and useful improvements in fishing rod holders and the primary object of the present invention is to provide a fishing rod holder including an electrically operated signal and embodying novel and improved switch means controlling said signal and so designed as to be actuated to a circuit closing position by the rotatable operating handle of a fishing reel.

Another important object of the present invention is to provide a fishing rod holder having a recess therein for receiving a fishing pole and reel, an electrical signal, and including a grounding switch for the signal that is engageable with the operating handle of the reel during the rotation thereof resulting from a fish striking the fishing line in order to move the grounding switch to a circuit closing position, said grounding switch also effecting a sound as the same is released by the operating handle.

A further object of the present invention is to provide a fishing rod holder embodying means whereby a fishing rod and reel may be quickly and readily applied thereto or removed therefrom in a convenient manner.

A still further aim of the present invention is to provide a fishing rod holder of the aforementioned character that is simple and practical in construction, strong and reliable in use, small and compact in structure, neat and attractive in appearance, relatively inexpensive to manufacture, and otherwise well adapted for the purposes for which the same is intended.

Other objects and advantages reside in the details of construction and operation, reference being had to the accompanying drawings forming part hereof, wherein like numerals refer to like parts throughout, and in which.

Figures 1, 2, 3:
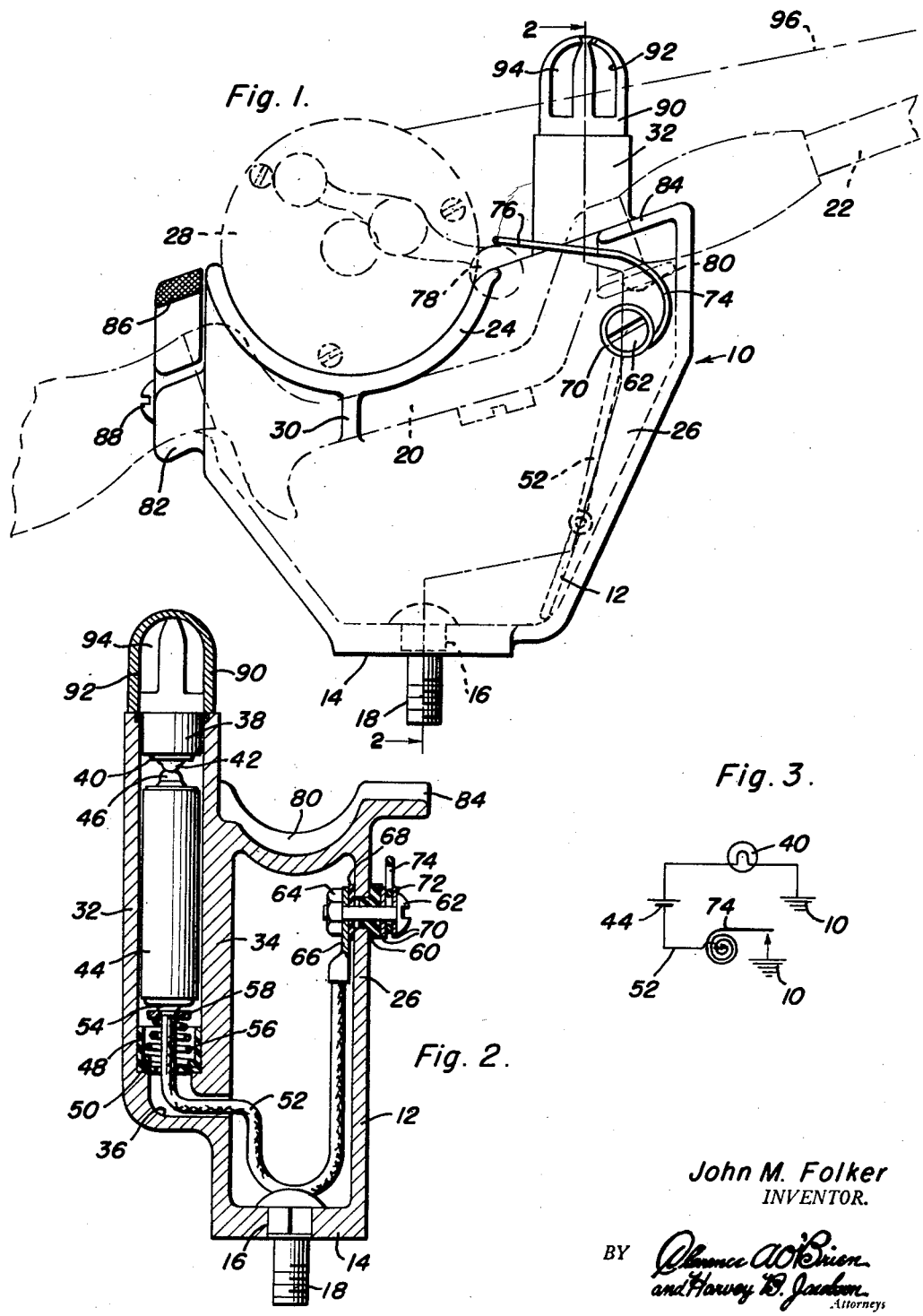
Figure 1 is a side elevational view of the present invention and showing a fishing rod and reel (in dotted lines) applied thereto.
Figure 2 is a detail sectional view of the present invention taken substantially on the plane of broken section line 2—2 of Figure 1 and showing the manner in which the signal is connected to the switch member.
Figure 3 is a schematic view showing the electrical circuit used in conjunction with the present invention.

Referring now to the drawings in detail, wherein for the purpose of illustration, there is disclosed a preferred embodiment of the present invention, the numeral 10 represents a hollow housing or support generally, having a downwardly tapering lower portion 12 including a bottom wall 14. The bottom wall 14 is centrally apertured, as at 16, to receive an attaching or carriage bolt 18 whereby the housing 10 may be supported relative to a structural element.

The upper end of the housing 10 is open to receive the reel supporting portion 20 of a fishing rod 22 and a concavo-convexed reel support portion 24 is integrally formed with the housing 10 and conforms to the contour of a fishing reel 28 that is suitably mounted on the portion 20. The reel support portion 24 is braced to the side wall 12 by a rib 30 that forms an integral part of the support 24 and housing 10.

A substantially cylindrical housing or compartment 32 is integrally formed with the longitudinal side wall 34 of the housing 10 and the lower end thereof communicates with the hollow interior of the housing 10 by way of a passage 36.

A conductive socket or sleeve 38 is suitably fixed in the open upper end of the cylindrical housing 32 and receives a lamp bulb 40 having a contact tip 42 to ground the bulb to the housing 10.

A preferably one cell storage battery 44 is mounted in the compartment 32 and includes a terminal 46 that engages the contact tip of the lamp 40.

An insulating, resilient cup 48 rests upon an annular shoulder 50 in the compartment 32 and is centrally apertured to receive a conductor or insulated wire 52. A conductive plate 54 is fixed to one end of the wire 52 and bears against the base of the battery 44. A substantially conical spring 56 embraces the wire 52 and is supported on the cup 48 to urge the plate 54 and a washer 58 adjacent the plate 54 into engagement with the battery 44 and the terminal 46 of the battery against the tip 42 of the lamp 40.

A fiber grommet or sleeve 60 carried by the side wall 26 receives and supports a bolt 62 having a threaded inner end that receivably engages a nut 64.

The wire 52 is provided with an eye terminal 66 that receives the bolt 62 and which is clamped between the nut 64 and an insulating washer 68 on the bolt 62 that bears against the inner surface of the side wall 26.

Clamped between a pair of spaced, metallic washers 70 on the outer end of the bolt 62, is the eye terminal 72 of an arcuate resilient arm or switch member 74. The free end portion 76 of the arm 74 is disposed in the path of rotation for the rotatable operating lever or handle 78 of the reel 28.

The forward and rear end walls of the housing 10 are formed at their upper ends with concaved supports or inturned flanges 80 and 82, and the support 80 is provided with a projection 84 that projects outwardly from the side wall 26 in spaced relationship to the arm 74. The space between arm 74 and projection 84 may be bridged in order to close an electric circuit to the lamp bulb 40.

A suitable thumb latch or clamp 86 carried by the rear portion of the housing 10 is held relative to the flange 82 by a fastener 88 and cooperates with the flange 82 in clampingly supporting the fishing rod 22 relative to the housing 10.

A shield 90 is detachably secured to the compartment 32 in any suitable manner and encases the lamp 40. The shield 90 is provided with openings 92 that are closed by transparent or translucent strips of material 94 preferably of red plastic.

In practical use of the present invention, as a fish strikes a hook attached to the fishing line 96, the operating handle will rotate in a counter-clockwise direction as illustrated in Figure 1 to engage the end portion 76 of the arm 74 and force the arm 74 against the projection 84 thus grounding the battery 44 and completing the circuit to the lamp 40 to energize the same.

When the spring member or arm 74 is released by the handle 78, the same will oscillate, due to its resilient characteristics to engage the projection 84 which will emit a chime effect or sound.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In combination with a fishing reel having a rotatable crank handle, a holder comprising a housing having a recess for receiving said reel, an electric battery carried by said housing, an electrically operated signal supported on said housing and connected to said battery to be operated thereby, a ground wire leading from said battery, and a grounding member connected to said wire and normally spaced from said housing in circuit open position, said ground member being engaged by said crank handle and urged against said housing in circuit closing position during rotation of said crank handle.

2. The combination of claim 1 wherein said grounding member includes a resilient conductive arm having a free end portion adapted to engage the crank handle.

3. The combination of claim 1 wherein said signal includes a lamp, and a shield embracing said lamp.

4. In combination with a fishing reel having a rotary operating crank handle, a holder comprising, a housing having a recess therein receiving said reel, a battery compartment at one side of said housing, a battery positioned in said compartment and including a terminal and a base, an electrical signal operatively connected to the terminal of the battery, a resilient switch arm at one side of said housing disposed in the path of rotation of said operating crank handle for engaging the latter, a flexible conductor having first and second end portions, means mounted in said compartment and yieldingly urging the first end portion of said conductor against the base of said battery, means securing the arm to said housing and also connecting said arm to the second end portion of said conductor, and an abutment on said housing against which said arm is urged by said crank handle during rotation of said crank handle.

5. The combination of claim 4 wherein said means yieldingly urging the first end portion of said conductor against the base of said battery includes an insulating cup having a central aperture receiving the first end portion of said conductor, a washer fixed about the first end portion of said conductor, and a spring embracing the first end portion of said conductor and biased between said washer and said cup.

6. In combination with a fishing reel having a rotary operating crank handle, a holder comprising a housing having a portion for receiving the reel, an electrically operated signal carried by the housing, and a switch including an arm insulated from the housing and an abutment on the housing, said switch being operatively connected to the signal and being normally in a circuit open position with said arm spaced from said abutment, said switch arm being actuated to contact said abutment and complete a circuit to said signal by the crank handle during rotation of the crank handle.

7. The combination of claim 6, wherein said arm comprises a resilient member disposed in the path of rotation of said operating crank handle for engagement by the latter.

JOHN M. FOLKER.

REFERENCES CITED

The following references are of record in the file of this patent:

UNITED STATES PATENTS

| Number | Name | Date |
|---|---|---|
| 87,188 | Monnier | Feb. 23, 1869 |
| 371,777 | McCabe | Oct. 18, 1887 |
| 380,899 | Jones | Apr. 10, 1888 |
| 808,958 | Varley | Jan. 2, 1906 |
| 1,120,712 | Hall | Dec. 15, 1914 |
| 1,870,782 | Minutilli | Aug. 9, 1932 |
| 2,145,929 | Herman | Feb. 7, 1931 |
| 2,309,350 | Nanasko | Jan. 26, 1943 |
| 2,311,823 | Gaskill, Sr. | Feb. 23, 1943 |
| 2,457,075 | Williams | Dec. 21, 1948 |